(12) United States Patent
Logue et al.

(10) Patent No.: US 10,371,173 B2
(45) Date of Patent: Aug. 6, 2019

(54) LINER FOR A GAS TURBINE ENGINE

(71) Applicant: UNITED TECHNOLOGIES CORPORATION, Farmington, CT (US)

(72) Inventors: Michaela M. Logue, Glastonbury, CT (US); Oliver V. Atassi, Longmeadow, MA (US)

(73) Assignee: United Technologies Corporation, Farmington, CT (US)

( * ) Notice: Subject to any disclaimer, the term of this patent is extended or adjusted under 35 U.S.C. 154(b) by 613 days.

(21) Appl. No.: 14/706,259

(22) Filed: May 7, 2015

(65) Prior Publication Data

US 2016/0327064 A1    Nov. 10, 2016

(51) Int. Cl.

| | | |
|---|---|---|
| F01D 25/04 | (2006.01) | |
| F04D 29/66 | (2006.01) | |
| F02K 1/08 | (2006.01) | |
| F02K 1/82 | (2006.01) | |
| F02K 3/06 | (2006.01) | |
| F02C 7/045 | (2006.01) | |
| F04D 29/52 | (2006.01) | |

(Continued)

(52) U.S. Cl.
CPC .......... *F04D 29/668* (2013.01); *F01D 25/04* (2013.01); *F01D 25/162* (2013.01); *F02C 7/045* (2013.01); *F02K 1/08* (2013.01); *F02K 1/827* (2013.01); *F02K 3/06* (2013.01); *F04D 29/526* (2013.01); *F04D 29/541* (2013.01); *F05D 2220/36* (2013.01); *F05D 2240/12* (2013.01); *F05D 2250/283* (2013.01); *F05D 2260/96* (2013.01); *F05D 2260/963* (2013.01)

(58) Field of Classification Search
CPC .... F04D 29/526; F04D 29/541; F04D 29/668; F01D 25/04; F01D 25/24; F05D 2240/14; F02C 7/045; F02K 1/08; F02K 1/827; F02K 3/06

See application file for complete search history.

(56) References Cited

U.S. PATENT DOCUMENTS 4,858,721 A * 8/1989 Autie .................. G10K 11/172
                                                    181/213
5,060,471 A * 10/1991 Torkelson ............... F02K 1/827
                                                    181/213

(Continued)

FOREIGN PATENT DOCUMENTS

| EP | 2116695 | 11/2009 |
|---|---|---|
| EP | 2096269 | 3/2013 |
| WO | 2014197035A2 A2 | 12/2014 |

OTHER PUBLICATIONS

European Search Report for EP 16 16 8799.

*Primary Examiner* — Aaron R Eastman
(74) *Attorney, Agent, or Firm* — Cantor Colburn LLP

(57) ABSTRACT

A gas turbine engine is provided having a fan case and a translating sleeve positioned downstream from the fan case. A flow channel extends between the fan case and the translating sleeve. The flow channel includes an inner diameter and an outer diameter. A structural guide vane is positioned within the flow channel and extends from the inner diameter to the outer diameter. A liner is positioned between an aft end of the fan case and an aft end of the translating sleeve to reduce vibratory stress on the structural guide vane.

14 Claims, 4 Drawing Sheets

(51) Int. Cl.
*F04D 29/54* (2006.01)
*F01D 25/16* (2006.01)

(56) References Cited

U.S. PATENT DOCUMENTS

| | | | |
|---|---|---|---|
| 5,478,199 A * | 12/1995 | Gliebe | B64D 33/02 |
| | | | 244/1 N |
| 6,764,276 B2 | 7/2004 | Mulcaire et al. | |
| 7,328,771 B2 | 2/2008 | Costa et al. | |
| 7,784,283 B2 | 8/2010 | Yu et al. | |
| 7,870,929 B2 | 1/2011 | Farstad | |
| 8,578,697 B2 | 11/2013 | Harper et al. | |
| 8,579,225 B2 * | 11/2013 | Mardjono | F02C 7/24 |
| | | | 181/288 |
| 8,636,464 B2 | 1/2014 | Bottome | |
| 2014/0090923 A1 * | 4/2014 | Murray | F02K 3/06 |
| | | | 181/222 |
| 2015/0023780 A1 | 1/2015 | Costa et al. | |

* cited by examiner

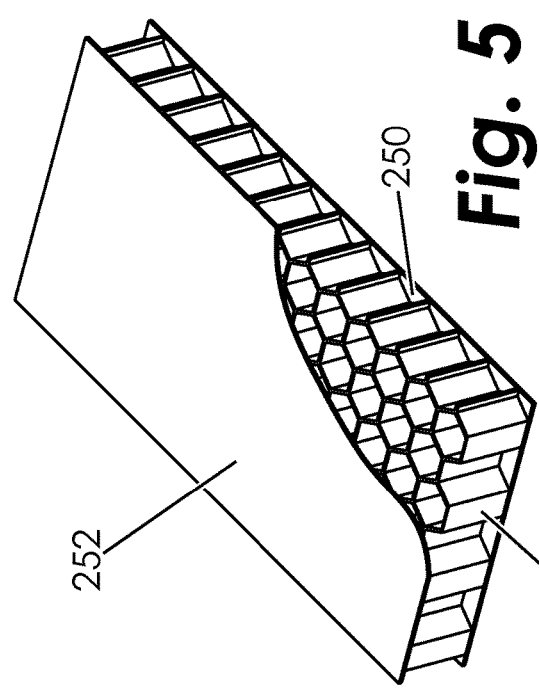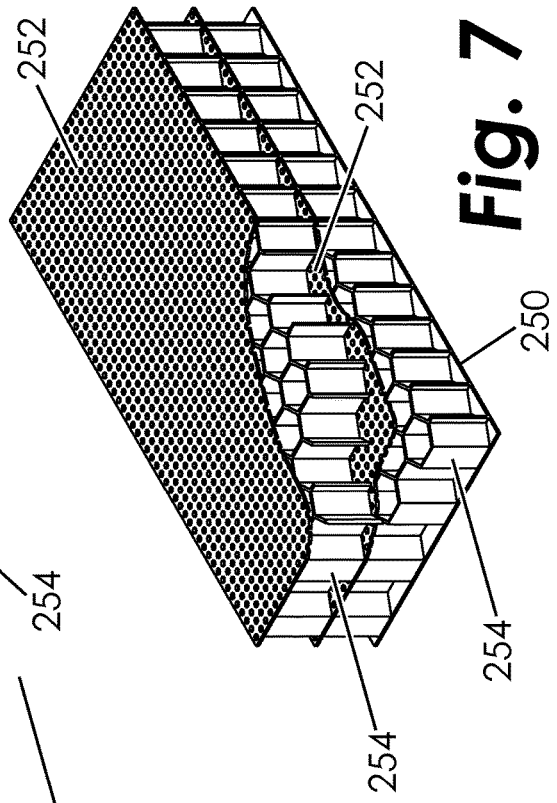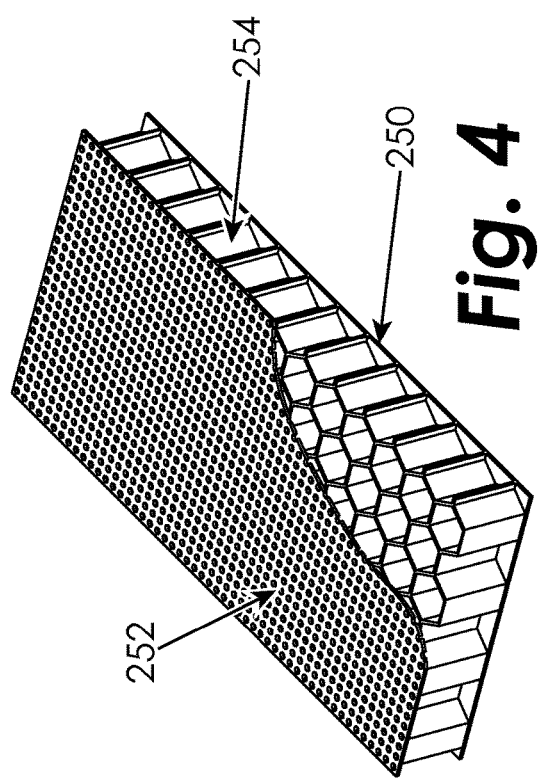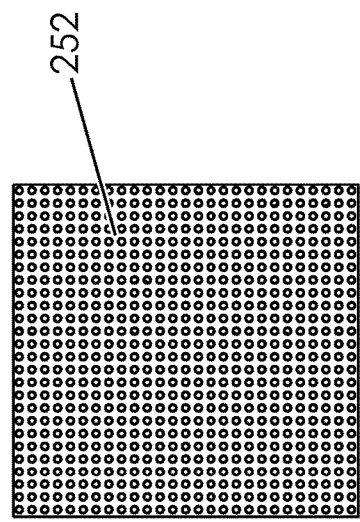

LINER FOR A GAS TURBINE ENGINE

TECHNICAL FIELD OF THE DISCLOSED EMBODIMENTS

The embodiments herein generally relate to gas turbine engines and, more particularly, to a liner for a gas turbine engine.

BACKGROUND OF THE DISCLOSED EMBODIMENTS

Generally, a vibratory stress allowance of the structural guide vane is limited to a percentage of the structural guide vane's Goodman capability, wherein the Goodman capability is a maximum amount of vibratory stress that the structural guide vane can withstand before cracking. Reducing vibratory stresses to meet the Goodman capability is technically challenging and is typically accomplished by making changes to the airfoil part, the airfoil material properties, the steady stress of the airfoil, or by modifying the source of the vibration.

Liners are currently used in the engine or the nacelle of the engine to reduce the fan module noise. As such the liner is designed to reduce noise. Particularly, the liner is designed to attenuate frequencies over 1,000 Hertz.

SUMMARY OF THE DISCLOSED EMBODIMENTS

In one aspect, a gas turbine engine is provided having a fan case and a translating sleeve positioned downstream from the fan case. A flow channel extends between the fan case and the translating sleeve. The flow channel includes an inner diameter and an outer diameter. A structural guide vane is positioned within the flow channel and extends from the inner diameter to the outer diameter. A liner is positioned between an aft end of the fan case and an aft end of the translating sleeve to reduce vibratory stress on the structural guide vane.

In a further embodiment of the above, the liner includes a thickness capable of attenuating vibrations having a frequency of less than 1,000 Hertz.

In a further embodiment of any of the above, the structural guide vane includes a leading edge and a trailing edge. The liner is positioned along the outer diameter between the aft end of the fan case and a leading edge of the structural guide vane.

In a further embodiment of any of the above, the structural guide vane defines an inner diameter vane passage and an outer diameter vane passage. The liner is positioned along the inner diameter in the inner diameter vane passage.

In a further embodiment of any of the above, the structural guide vane defines an inner diameter vane passage and an outer diameter vane passage. The liner is positioned along the outer diameter in the outer diameter vane passage.

In a further embodiment of any of the above, the inner diameter of the flow channel includes an inner diameter splitter. The liner is positioned along the inner diameter splitter.

In a further embodiment of any of the above, the structural guide vane includes a leading edge and a trailing edge. The liner is positioned along the outer diameter between the trailing edge of the structural guide vane and the translating sleeve.

In a further embodiment of any of the above, the gas turbine engine also includes an inner fixed structure extending along the inner diameter of the flow channel. The structural guide vane includes a leading edge and a trailing edge. The liner is positioned along the inner diameter between the trailing edge of the structural guide vane and the inner fixed structure.

In a further embodiment of any of the above, the liner is positioned along the outer diameter along the translating sleeve.

In another aspect, a method of reducing vibratory stress on a structural guide vane extending between an inner diameter and outer diameter of a flow channel formed between a fan case and a translating sleeve is provided. The method includes forming a liner including a thickness capable of attenuating vibrations having a frequency of less than 1,000 Hertz. The method also includes positioning the liner between an aft end of the fan case and an aft end of the translating sleeve.

In a further embodiment of the above, the structural guide vane includes a leading edge and a trailing edge. The method further includes positioning the liner along the outer diameter between the aft end of the fan case and a leading edge of the structural guide vane.

In a further embodiment of any of the above, the structural guide vane defines an inner diameter vane passage and an outer diameter vane passage. The method further includes positioning the liner along the inner diameter in the inner diameter vane passage.

In a further embodiment of any of the above, the structural guide vane defines an inner diameter vane passage and an outer diameter vane passage. The method further includes positioning the liner along the outer diameter in the outer diameter vane passage.

In a further embodiment of any of the above, the inner diameter of the flow channel includes an inner diameter splitter. The method further includes positioning the liner along the inner diameter splitter.

In a further embodiment of any of the above, the structural guide vane includes a leading edge and a trailing edge. The method further includes positioning the liner along the outer diameter between the trailing edge of the structural guide vane and the translating sleeve.

In a further embodiment of any of the above, the gas turbine engine includes an inner fixed structure extending along the inner diameter of the flow channel. The structural guide vane includes a leading edge and a trailing edge. The method further includes positioning the liner along the inner diameter between the trailing edge of the structural guide vane and the inner fixed structure.

In a further embodiment of any of the above, the method further includes positioning the liner along the outer diameter along the translating sleeve.

In another aspect, a system is provided having a flow channel including an inner diameter and an outer diameter. A structural guide vane extends between the inner diameter and the outer diameter. A rotating member is configured to rotate adjacent to the structural guide vane. A liner is positioned on at least one of the inner diameter and the outer diameter to attenuate vibrations from the rotating member having a frequency of less than 1,000 Hertz to reduce vibratory stress on the structural guide vane.

In a further embodiment of the above, the liner is positioned adjacent the structural guide vane.

In a further embodiment of any of the above, the structural guide vane defines an inner diameter vane passage and an outer diameter vane passage. The liner is positioned along at least one of the inner diameter vane passage or the outer diameter vane passage. Other embodiments are also disclosed.

BRIEF DESCRIPTION OF DRAWINGS

The embodiments described herein and other features, advantages and disclosures contained herein, and the manner of attaining them, will become apparent and the present disclosure will be better understood by reference to the following description of various exemplary embodiments of the present disclosure taken in conjunction with the accompanying drawing, wherein:

FIG. 4 is a perspective view of an acoustic liner in an embodiment.

FIG. 5 is a perspective view of an acoustic liner in an embodiment.

FIG. 6 is a perspective view of an acoustic liner in an embodiment.

FIG. 7 is a perspective view of an acoustic liner in an embodiment.

DETAILED DESCRIPTION OF THE DISCLOSED EMBODIMENTS

Figure 1:
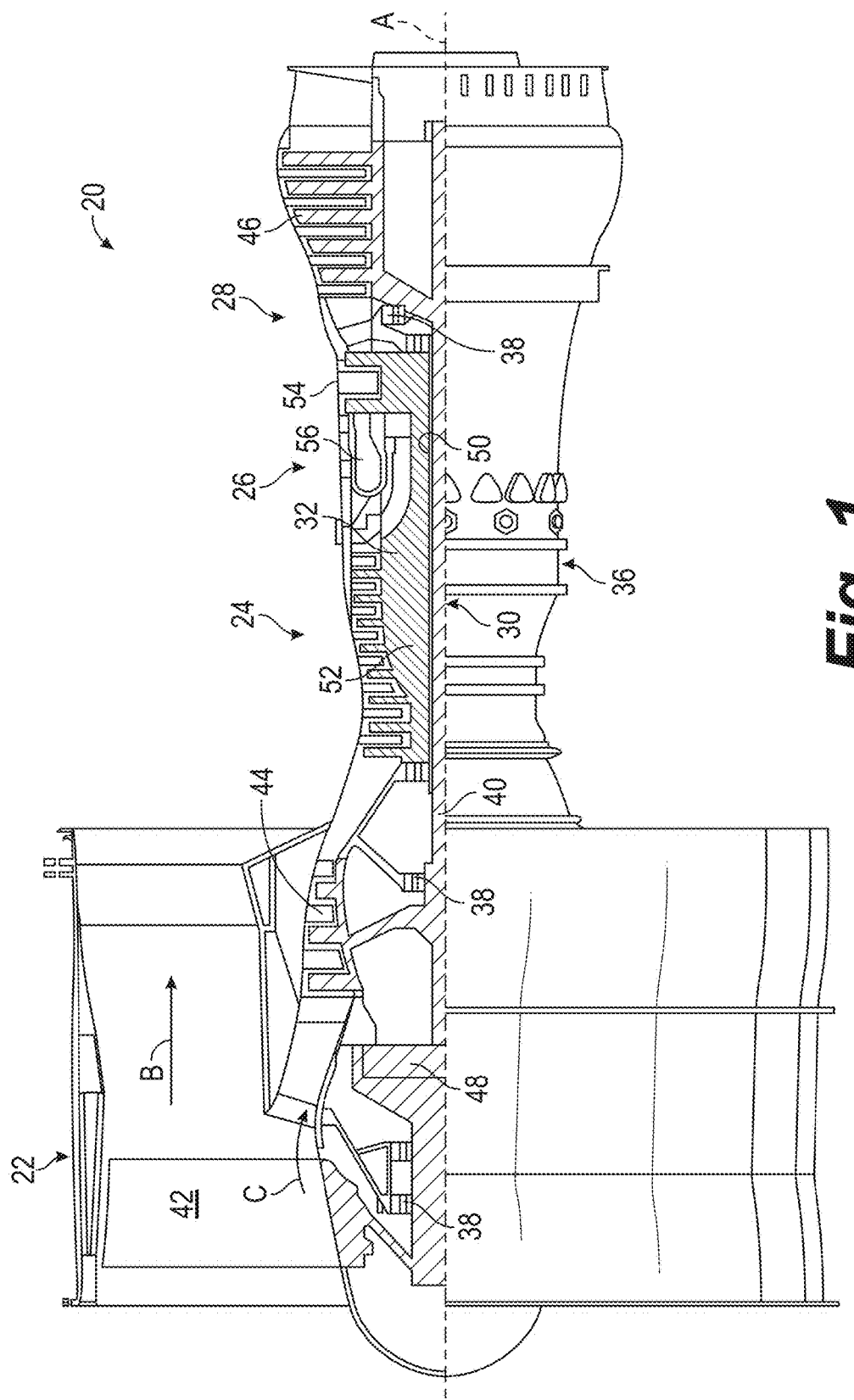
FIG. 1 is a sectional view of a gas turbine engine in an embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 shows a gas turbine engine 20, such as a gas turbine used for power generation or propulsion, circumferentially disposed about an engine centerline, or axial centerline axis A. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") or Structural Guide Vane ("SGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tfan ° R)/

$(518.7° R)]^{0.5}$. The "Low corrected fan tip speed" as disclosed herein according to one non-limiting embodiment is less than about 1150 ft/second (350.5 m/sec).

Figure 2:
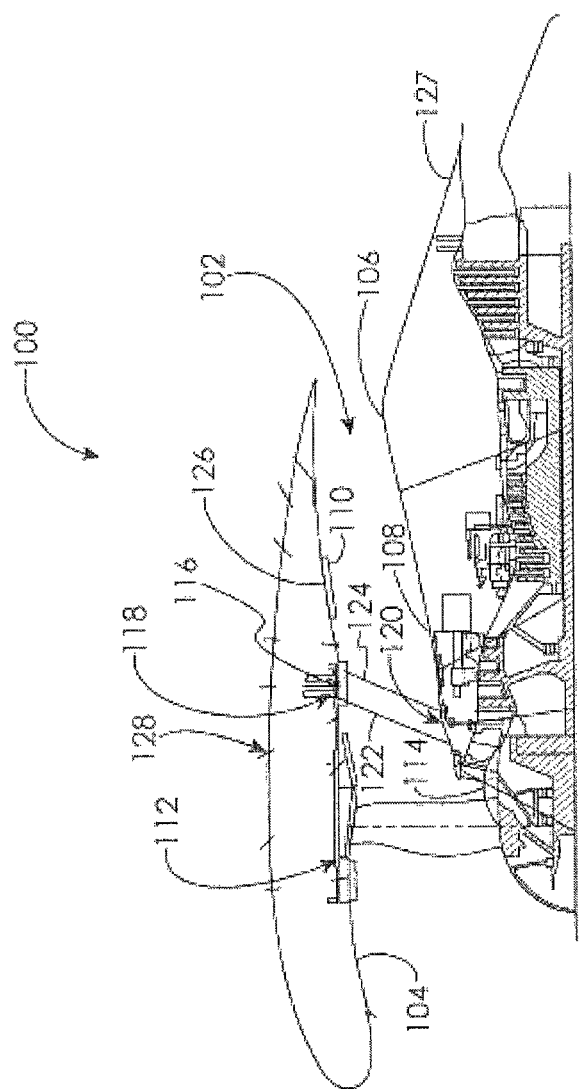
FIG. 2 is a sectional view of a gas turbine engine in an embodiment.

FIG. 2 illustrates a gas turbine engine 100 having a flow channel 102 extending between an inlet 104 and an inner fixed structure 106. The flow channel 102 is defined by an inner diameter 108 and an outer diameter 110. A fan case 112 is positioned downstream of the inlet 104. An inner diameter splitter 114 is positioned downstream from the fan case 112 and extends along the inner diameter 108. A structural guide vane 116 is positioned downstream from the fan case 112 and the inner diameter splitter 114. The structural guide vane 116 defines an outer diameter vane passage 118 along the outer diameter 110 and an inner diameter vane passage 120 along the inner diameter 108. The structural guide vane 116 includes a leading edge 122 and a trailing edge 124. A blocker door 126 is positioned downstream from the structural guide vane 116 along the outer diameter 110. The inner fixed structure 106 is positioned downstream of the structural guide vane 116 along the inner diameter 108. A translating sleeve 127 is positioned downstream from the inner fixed structure 106 along the inner diameter 108.

The embodiments described herein use an engine and/or nacelle liner 200, for example the liners described below with respect to FIG. 3, to reduce the vibratory stress on the structural guide vane 116. Liner 200 depth and porousness, as well as placement in relation to the structural guide vane 116, are designed for the purposes of reducing vibratory stress. In one embodiment, a liner 200 is positioned between an aft end 128 of the fan case 112 and an aft end of the translating sleeve 127 to reduce vibratory stress on the structural guide vane 116. Alternatively, the liner 200 has a thickness capable of attenuating vibrations having a frequency of less than 1,000 Hertz. Optionally, the liner 200 is positioned along the outer diameter 110 between the aft end 128 of the fan case 112 and the leading edge 122 of the structural guide vane 116. In another embodiment, the liner 200 is positioned along the inner diameter 108 in the inner diameter vane passage 120. In an alternative embodiment, the liner 200 is positioned along the outer diameter 110 in the outer diameter vane passage 118. In one embodiment, the liner 200 is positioned along the inner diameter splitter 114. Optionally, the liner 200 is positioned along the outer diameter 110 between the trailing edge 124 of the structural guide vane 116 and the blocker door 126. Alternatively, the liner 200 is positioned along the inner diameter 108 between the trailing edge 124 of the structural guide vane 116 and the inner fixed structure 106. In other embodiments, the liner is positioned along the outer diameter 110 along the blocker door 126. In an alternative embodiment, the liner is positioned on the inner fixed structure 106. In one embodiment, the liner is positioned on the translating sleeve 127.

By tuning the liner 200 to the frequency and speed of the resonant crossing, the energy of the system is attenuated, and the unsteady pressure response of the structural guide vane 116 is reduced, thereby reducing the component vibratory resonant stress of the mode(s) selected. An engine and nacelle liner 200 tuned to a particular structural guide vane's mode shape at its resonant crossing will change the unsteady pressure on the structural guide vane 116 due to the rotor-wake/stator vane interaction. The liner 200 will also reduce the component vibratory stress of the structural guide vane 116. The reduction in stress is achieved without modifications to the structural guide vane's 116 structural or aerodynamic properties.

In order to demonstrate the benefit of tuning the liner 200 to a structural guide vane mode shape, the second torsion mode shape of the structural guide vane is selected, wherein the resonant crossing for the mode occurs at 725 Hz and a mechanical speed of 2486 RPM. Three resonant stress predictions are calculated: 1) a hard-wall flow channel geometry with no liner; 2) a flow channel with liner properties tuned for noise mitigation only; and 3) a flow channel with liner properties tuned to reduce vibratory stresses, as shown in FIG. 3. In case 1, there is no liner treatment in the analytical model. This case serves as a baseline, hard-wall flow channel. The second case models the typical liner locations of the engine. The third case tunes the current engine liner configuration to the torsion mode frequency at a Mach number of 0.4.

Figure 3:
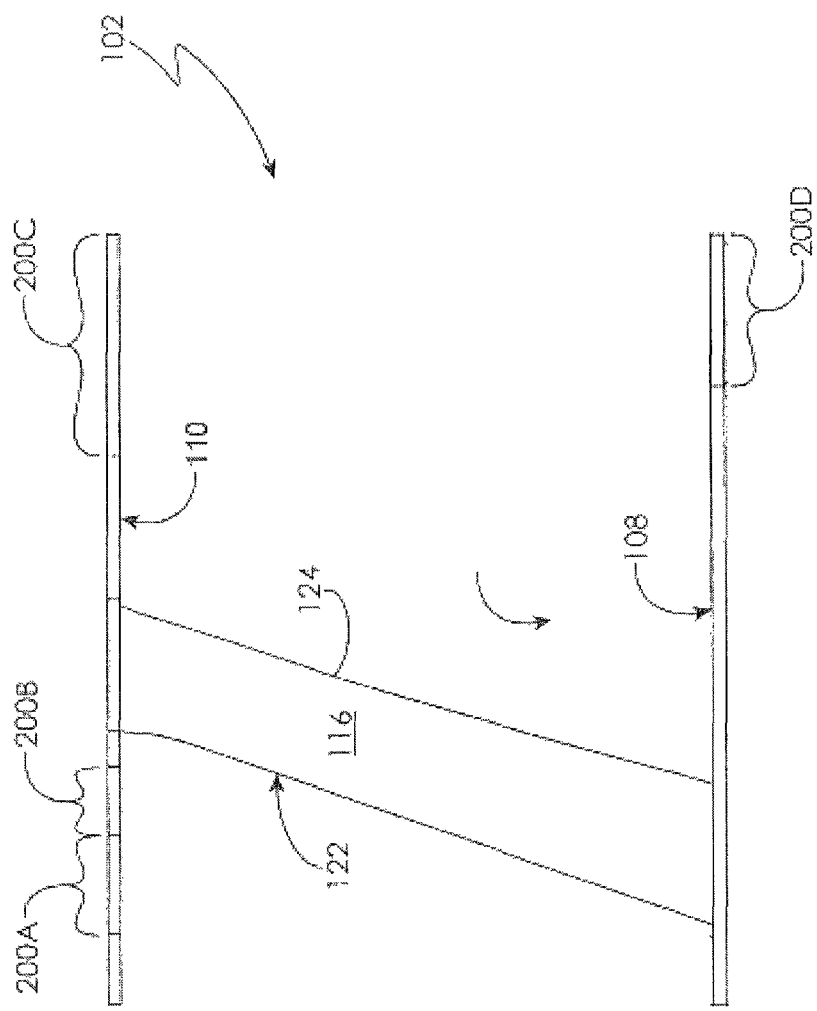
FIG. 3 is a sectional view of a structural guide vane in an embodiment.

Case 3, illustrated in FIG. 3, includes patches of liner 200 along the wall of the flow channel 102. The patches include individual segments of liner 200 that are utilized to cover a portion of the wall of the flow channel 102. Each patch is independent of every other patch, although some patches may abut one another. Two patches 200A and 200B are on the outer diameter 110, wherein patches 200A and 200B are forward of the vane leading edge 122. Another patch 200C is aft of the vane trailing edge 124. Another patch 200D is on the inner diameter 108 and is aft of the vane trailing edge 124. The following table summarizes the impedance values used in Cases 2 and 3.

| | Patch 200A | | Patch 200B | | Patch 200C | | Patch 200D | |
|---|---|---|---|---|---|---|---|---|
| Case | Resistance | Reactance | Resistance | Reactance | Resistance | Reactance | Resistance | Reactance |
| 2 | 1.5702 | −3.0142 | 1.5329 | −8.1568 | 1.2094 | −3.2530 | 0.9494 | 2.3928 |
| 3 | 0.4000 | −0.6000 | 0.4000 | −0.6000 | 0.5700 | −0.2500 | 0.5700 | −0.2500 |

The following table gives a summary of the predicted vibratory stress for these three cases. The results demonstrate that a liner 200 tuned for acoustic purposes may help reduce the vibratory stress when compared to a no-liner, hard-wall configuration. An 11% reduction is predicted when comparing case 2 (liner tuned only for noise mitigation) to case 1. However, tuning the liner of case 2 to the torsion mode resonant frequency of the structural guide vane 116 (case 3) shows a much large reduction in vibratory stress, wherein a 50% reduction is achieved over the hard wall configuration.

| Case Number | Case Description | Predicted Component Vibratory Stress | Percent Change from Case 1 |
|---|---|---|---|
| 1 | Hard wall annular duct geometry (no liner) | 4.4 ksi | 0% |
| 2 | Annular duct with liner properties tuned for noise mitigation | 3.9 ksi | −11% |
| 3 | Case (2) with liner properties optimally tuned to reduce vibratory stress | 2.2 ksi | −50% |

FIGS. 4-7 illustrate exemplary acoustic liners 200 that are composed of a rigid backsheet 250, a porous facesheet 252, and a honeycomb mid-layer 254. The porous facesheet 252 may consist of perforated plate (FIG. 4), a woven mesh (FIG. 5), or a micro-perforated plate (FIG. 6). The liner 200 may also contain multiple layers of honeycomb (FIG. 7). Other liner construction may also be considered when targeting the resonant frequency of the airfoil. For example, also using a mid-layer construction consisting of volumes rather than honeycomb may better target the frequencies of concern. The depth of the honeycomb cells or the size of the volumes in the mid-layer is chosen to control the frequency at which max attenuation occurs. The deeper the liner or larger the size of the volumes, the lower the frequency it attenuates.

While the embodiments have been illustrated and described in detail in the drawings and foregoing description, the same is to be considered as illustrative and not restrictive in character, it being understood that only certain embodiments have been shown and described and that all changes and modifications that come within the spirit of the embodiments are desired to be protected.

What is claimed is:

1. A gas turbine engine comprising:
   a fan case, a translating sleeve positioned downstream in a direction of flow from the fan case,
   a flow channel extending axially between the fan case and the translating sleeve, the flow channel including a plurality of walls including an inner diameter wall and an outer diameter wall, and a structural guide vane positioned within the flow channel and extending from the inner diameter wall to the outer diameter wall; and
   a plurality of liner patches on one or both of the plurality of walls for covering a discrete portion of the one or both of the plurality of walls, the plurality of liner patches being mutually independent and individual vibration attenuating liner patches, the plurality of liner patches positioned aft of the fan case, proximate in the direction of flow to the structural guide vane and distal in the direction of flow to the fan case and the translating sleeve, and the plurality of liner patches being mutually spaced in the direction of flow along the flow channel so that the plurality of liner patches are mutually nonabutting, and
   wherein the plurality of liner patches reduce vibratory stress on the structural guide vane, the liner having a thickness capable of attenuating vibrations having a frequency of less than 1,000 Hertz.

2. The gas turbine engine of claim 1, wherein at least one of the plurality of liner patches is positioned upstream of the structural guide vane and along the outer diameter of the flow channel.

3. The gas turbine engine of claim 1, wherein at least one of the plurality of liner patches is positioned downstream of the structural guide vane and along the inner diameter of the flow channel adjacent to the structural guide vane.

4. The gas turbine engine of claim 1, wherein at least one of the plurality of liner patches is positioned upstream or downstream of the structural guide vane and along the outer diameter of the flow channel adjacent to the structural guide vane.

5. The gas turbine engine of claim 1, wherein the inner diameter of the flow channel includes an inner diameter splitter, at least one of the plurality of liner patches is positioned upstream of the structural guide vane and along the inner diameter splitter.

6. The gas turbine engine of claim 1, wherein at least one of the plurality of liner patches is positioned downstream of the structural guide vane, upstream of the translating sleeve and along the outer diameter of the flow channel.

7. The gas turbine engine of claim 1, further comprising an inner fixed structure extending along the inner diameter of the flow channel, and wherein at least one of the plurality of liner patches is positioned downstream of the structural guide vane and along the inner fixed structure.

8. A method of reducing vibratory stress on a structural guide vane in a gas turbine engine,
   wherein the gas turbine engine includes:
   a fan case, a translating sleeve positioned downstream in a direction of flow from the fan case,
   a flow channel extending axially between the fan case and the translating sleeve, the flow channel including a plurality of walls including an inner diameter wall and an outer diameter wall, and the structural guide vane positioned within the flow channel and extending from the inner diameter wall to the outer diameter wall; and
   the structural guide vane extending between an inner diameter and outer diameter of a flow channel, the flow channel extending axially between a fan case and a translating sleeve,
   the method comprising:
   positioning a plurality of liner patches on one or both of the plurality of walls for covering a discrete portion of the one or both of the plurality of walls, the plurality of liner patches being mutually independent and individual vibration attenuating liner patches, the plurality of liner patches positioned aft of the fan case, proximate in the direction of flow to the structural guide vane and distal in the direction of flow to the fan case and the translating sleeve, and the plurality of liner patches being mutually spaced in the direction of flow along the flow channel so that the plurality of liner patches are mutually nonabutting, and
   wherein the plurality of liner patches reduce vibratory stress on the structural guide vane, the liner having a thickness capable of attenuating vibrations having a frequency of less than 1.000 Hertz.

9. The method of claim 8, wherein the method further comprises positioning the at least one of the plurality of liner patches upstream of the structural guide vane and along the outer diameter of the flow channel.

10. The method of claim 8, wherein the method further comprises positioning at least one of the plurality of the liner patches downstream of and adjacent to the structural guide vane and along the inner diameter of the flow channel.

11. The method of claim 8, wherein the method further comprises positioning at least one of the plurality of the liner patches upstream or downstream of, and adjacent to the structural guide vane and along the outer diameter of the flow channel.

12. The method of claim 8, wherein the inner diameter of the flow channel includes an inner diameter splitter, the method further comprising positioning at least one of the plurality of the liner patches upstream of the structural guide vane and along the inner diameter splitter.

13. The method of claim 8, wherein the method further comprises positioning at least one of the plurality of liner patches downstream of the structural guide vane, upstream of the translating sleeve and along the outer diameter of the flow channel.

14. The method of claim 8, wherein the gas turbine engine includes an inner fixed structure extending along the inner diameter of the flow channel, and the method further comprises positioning at least one of the plurality of liner patches downstream of the structural guide vane and along the inner fixed structure.

\* \* \* \* \*